US007962915B2

(12) United States Patent
Eshel et al.

(10) Patent No.: US 7,962,915 B2
(45) Date of Patent: Jun. 14, 2011

(54) SYSTEM AND METHOD FOR PRESERVING STATE FOR A CLUSTER OF DATA SERVERS IN THE PRESENCE OF LOAD-BALANCING, FAILOVER, AND FAIL-BACK EVENTS

(75) Inventors: Marc M. Eshel, San Jose, CA (US); Juan Carlos Gomez, San Jose, CA (US); Manoj Premanand Naik, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1575 days.

(21) Appl. No.: 11/084,446

(22) Filed: Mar. 18, 2005

(65) Prior Publication Data

US 2006/0212453 A1    Sep. 21, 2006

(51) Int. Cl.
*G06F 9/46* (2006.01)
*G06F 11/00* (2006.01)

(52) U.S. Cl. ........................................... 718/105; 714/2
(58) Field of Classification Search .................... 718/105
See application file for complete search history.

(56) References Cited

U.S. PATENT DOCUMENTS

| 5,566,297 | A  | * | 10/1996 | Devarakonda et al. ......... 714/15 |
| 5,796,934 | A  |   | 8/1998  | Bhanot et al. |
| 6,292,905 | B1 |   | 9/2001  | Wallach et al. |
| 6,539,494 | B1 |   | 3/2003  | Abramson et al. |
| 6,681,339 | B2 | * | 1/2004  | McKean et al. ................... 714/5 |
| 7,111,063 | B1 | * | 9/2006  | Clark et al. ..................... 709/225 |
| 7,284,151 | B2 | * | 10/2007 | Chandrasekaran ............... 714/9 |
| 7,356,531 | B1 | * | 4/2008  | Popelka et al. ..................... 707/8 |
| 7,363,365 | B2 | * | 4/2008  | Ocko et al. ..................... 709/223 |
| 7,469,279 | B1 | * | 12/2008 | Stamler et al. ................. 709/221 |
| 2001/0056554 | A1 |   | 12/2001 | Chrabaszcz |
| 2004/0034807 | A1 |   | 2/2004  | Rostowfske |
| 2004/0068563 | A1 | * | 4/2004  | Ahuja et al. ................... 709/225 |
| 2004/0153709 | A1 | * | 8/2004  | Burton-Krahn .................... 714/4 |
| 2004/0153757 | A1 |   | 8/2004  | Blakeney |

OTHER PUBLICATIONS

U.S. Appl. No. 60/591,729, filed Jul. 28, 2004, Landar, Oraf and Sh.

* cited by examiner

*Primary Examiner* — Emerson C Puente
*Assistant Examiner* — Gregory A Kessler
(74) *Attorney, Agent, or Firm* — Jon A. Gibbons; Fleit Gibbons Gutman Bongini & Bianco PL

(57) ABSTRACT

A state management system preserves a state for a cluster of file servers in a cluster file system in the presence of load balancing, failover, and fail-back events. The system provides a file and record locking solution for a clustered network attached storage system running on top of a cluster file system. The system employs a lock ownership scheme in which ownership identifiers are guaranteed to be unique across clustered servers and across various protocols the clustered servers may be exporting. The system supports multi-protocol clustered NAS gateways, NAS gateway server failover and fail-back, and load-balancing architectures. The system further eliminates a need for a lock migration protocol, resulting in improved efficiency and simplicity.

20 Claims, 6 Drawing Sheets

SYSTEM AND METHOD FOR PRESERVING STATE FOR A CLUSTER OF DATA SERVERS IN THE PRESENCE OF LOAD-BALANCING, FAILOVER, AND FAIL-BACK EVENTS

FIELD OF THE INVENTION

The present invention generally relates to cluster file systems in which a cluster of servers directs access to one or more storage devices. In particular, the present invention pertains to a method for maintaining state integrity during failure, failover, fail-back, and load balancing of servers in the cluster file system.

BACKGROUND OF THE INVENTION

The quest to make Network Attached Storage (NAS) scaleable has lead to architectures that depart from a traditional direct-attached storage (DAS) model. The DAS architecture comprises several storage devices attached to a single computer. In emerging NAS architectures (further referenced herein as a NAS clustered architecture) a cluster of computers comprises a NAS gateway. The NAS gateway shares the work of a traditional single-node NAS server. Storage devices are shared among the members of the cluster via a Storage Area Network (SAN).

The NAS clustered architecture is preferred to the traditional single-server architecture for various reasons. The NAS clustered architecture is highly scaleable in two dimensions: the quantity of storage devices that can be used and the number of computing servers performing file system services. Further, the NAS clustered architecture exhibits enhanced fault tolerance that makes it the preferred architecture of future NAS devices.

Although this technology has proven to be useful, it would be desirable to present additional improvements. Network-file access protocols such as, for example, the network file system (NFS) protocols that were traditionally embedded in NAS devices were not designed with such clustered architectures in mind. Consequently, the fault-tolerant file and record locking features supported by those protocols do not work well in the NAS clustered architecture.

One conventional approach to providing fault-tolerant file and record locking features to the NAS clustered architecture assigns ownership of all file and record |locks| to individual servers in the NAS gateway cluster. When a server in the NAS gateway receives a lock request, the server determines whether another server owns the lock. If another server owns the requested lock, the server receiving the lock request issues a demand-lock request via an inter-cluster message to the server owning the lock to initiate transfer of ownership of the lock to the server that received the current lock request.

The protocol for this approach requires ownership of locks to be transferred via an inter-cluster protocol requiring a set of messages; consequently, this approach entails some network overhead. This approach fails to address issues that appear when the cluster is used as a multi-protocol NAS server platform. Further, this approach does not address lock contention among the various network file system protocols nor does it address server failures and server failure recovery.

Another conventional |approach| forwards lock requests on a given file system to a single server thus avoiding the need for inter-cluster coordination while serving the request. A request received through a server that is not assigned to handle the lock requests for the underlying file system requires forwarding to the proper server, resulting in significant overhead. This approach does not support load balancing. Further, no effort is made by this approach to address multi-protocol support for locking at the cluster servers.

Yet another conventional approach utilizes state information managed by a file server; the state information is maintained among the clients of the distributed system. When a server fails in this approach, the state maintained by the clients is transferred to the backup server. This approach requires that clients maintain knowledge of the identity of a backup server. Clients are required to keep the server state and rebuild that server state on a new server in the case of a server failure. Further, this approach provides no means to fail-back the clients to the original server after recovery from failure.

Presently, there exists no known method for providing a distributed locking solution that works properly for various network file access protocols in the framework of a clustered NAS running on top of cluster file systems. What is therefore needed is a system, a computer program product, and an associated method for preserving state for a cluster of file servers in a cluster file system, in the presence of load-balancing, failover, and fail-back events. The need for such a file and record locking solution for a clustered NAS running on top of a cluster file system has heretofore remained unsatisfied.

SUMMARY OF THE INVENTION

The present invention satisfies the need for file and record locking solution for a clustered NAS running on top of a cluster file system, and presents a system, a computer program product, and an associated method (collectively referred to herein as "the system" or "the present system") for preserving a state for a cluster of file servers in the presence of load-balancing, failover, and fail-back events. The present system employs a lock ownership scheme in which ownership identifiers are guaranteed to be unique across clustered servers and across various protocols the clustered servers may be exporting; i.e., the present system comprises a global naming scheme for tracking lock ownership. The present system extends the concept of lock ownership to a global space that comprises NAS clients and cluster file system clients. This concept of lock ownership prevents collisions that may occur in conventional systems when local access to the file system is combined with NAS file serving.

The present system provides a mechanism for proper lock recovery upon cluster server failover and fail-back; this mechanism also enables lock transfers during load balancing events. The present system is consistent with multi-protocol NAS file serving.

The present system also solves common problems that arise in clustered NAS servers such as, uncommitted writes upon server failures and load balancing events. The present system further maintains a seamless, cluster file system space that is exported to clients.

The present system utilizes back-end storage device access provided by a clustered or distributed file system running in cluster servers; the cluster servers act as servers for the file system (or systems) hosted in the backend storage devices. The cluster servers are driven by cluster software (a cluster system) running on the cluster servers. The cluster system is capable of maintaining a persistent cluster state that outlives server failures. The cluster system further maintains a consistent cluster membership from which a leader can be elected to drive recovery tasks needed during server failures. The cluster is resilient to leader failures; i.e., once the leader server has gone down a new leader can be selected from the remaining membership.

The underlying cluster file system supports distributed record locking. The recovery of such locks is driven by leases granted to cluster servers that acquire the locks. The underlying cluster file system further supports optional delegation of byte-range locking to the cluster file system clients.

The present system carries out implicit lock transfers, requiring no message forwarding or explicit lock transfers between cluster servers as in conventional systems. The present system further manages server failures and fail-back in the cluster. The present system supports the presence of a load-balancing device in front of the cluster that may be used to balance network file system traffic.

The present system is complete, simpler than conventional systems, and minimizes changes to single server NAS code. The present system solves distributed locking issues in the framework of multi-protocol NAS file serving and concurrent local access to the cluster file system being exported via NAS protocols.

The present system allows any server in the NAS cluster to receive a lock request and process it directly; no forwarding is required.

Compared to conventional approaches, the present system does not assign ownership of locks to specific servers in the NAS cluster. Instead, the client owns a lock and the underlying instance of the lock in the cluster file system; no ownership transfer is required. The protocol of the present system requires only a change of lease ownership; the change in lease ownership is performed in a lazy manner, implicitly along with lock requests.

Compared to conventional systems, the present system does not require clients to maintain additional information. The present system consider all the server nodes equal peers and does not rely on a concept of primary and backup servers. This is an advantage because clients are not required to have prior knowledge of identity of a backup server. Instead, all servers have access to all state information so that there is no suspension of ongoing requests, transfer of state information from clients to backup server, and reconstruction of state prior to failure as it is usually the case for competing approaches. The present system provides a method to fail-back the clients to the original server after recovery from failure. The present system utilizes a combination of the clients and the backend shared file system to maintain server state.

This distributed lock management of the present system is designed to deal with file/lock access migration due to either NAS server failover and fail-back events or load balancing reconfigurations. The present system further eliminates a need for an explicit lock migration protocol, resulting in improved efficiency and simplicity compared to conventional approaches.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Fail-back: Transfer of operations back to a machine that recovered after a failure from the machine in the cluster that replaced it after the failure. Transfer of operations comprises functionality, clients, and state of the recovered machine.

Failover: Transfer of operations of a failing machine in a cluster to another machine in the cluster. Transfer comprises the functionality, clients, and state of the failing machine.

Load Balancing: Distributing work requests among all the machines in the cluster such that all the machines get an even share of the work.

Figure 1:
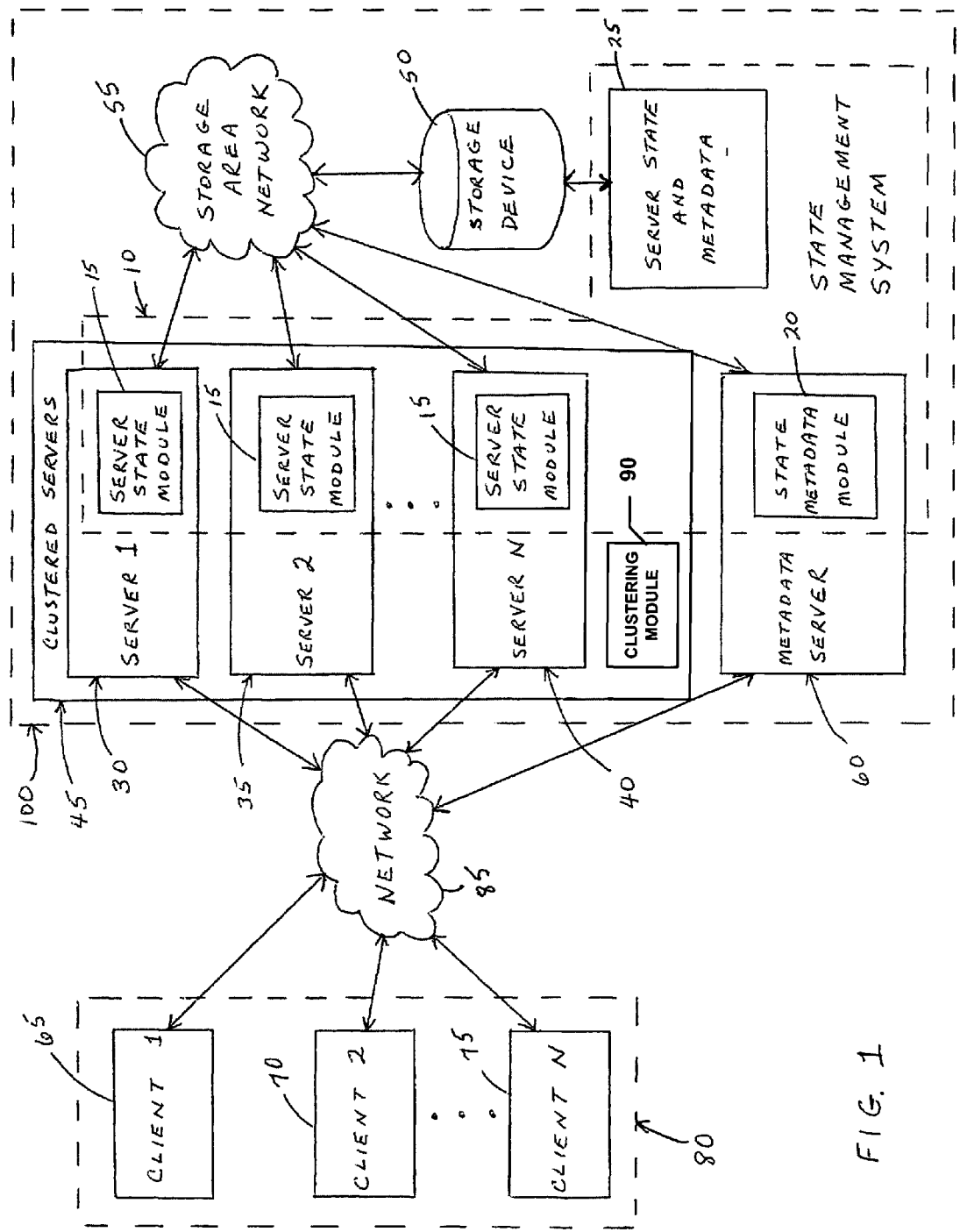
FIG. 1 is a schematic illustration of an exemplary cluster file system using more than one IP address in which a state management system of the present invention can be used.

FIG. 1 illustrates an exemplary high-level architecture of a shared storage database 100 comprising a state management system 10 (the "system 10"). System 10 comprises a server state module 15, a state metadata module 20, and a server state and metadata 25. System 10 further comprises a software programming code or computer program product that is typically embedded within, or installed on a computer. Alternatively, system 10 can be saved on a suitable storage medium such as a diskette, a CD, a hard drive, or like devices. While system 10 is described in terms of a cluster file system, it should be clear that system 10 is applicable as well to, for example, any shared storage database system.

The shared storage database 100 comprises a server 1, 30, a server 2, 35, through a server N, 40 (collectively referenced as clustered servers 45). The clustered servers 45 function as a network attached storage gateway. Each of the clustered servers 45 comprises a clustering module 90 that allows the clustered servers 45 to perform as a cluster. One of the clustered servers 45 plays a role of a cluster leader. Upon failure of the cluster leader, the clustering module 90 elects a surviving member of the clustered servers 45 to perform the role of the cluster leader. Each of the clustered servers 45 accesses data or files stored in a storage device 50 through a storage area network (SAN) 55. The shared storage database 100 further comprises a metadata server 60. The metadata server 60 accesses the server state and metadata 25 stored on the storage device 50 via storage area network 55.

Clients, such as the client 1, 65, client 2, 70, through client N, 75, (collectively referenced as clients 80) access the clustered servers 45 through a network 85. Each of clients 80 may represent an application such as, for example, a database management system, accessing data that is stored on the storage device 50. Each of the clustered servers 45 comprises a file server protocol such as, for example, network file system (NFS), for managing access by clients 80 to the data on the storage device 50. Clients 80 each comprise software that communicates with any of the clustered servers 45 to access data in the storage device 50.

The shared storage database 100 supports distributed byte-range (i.e. file record) locking. The recovery of these locks is driven by timed leases. The shared storage database 100 further supports delegation of byte-range locks to clustered server 45 and recall of such delegations. Lock state is maintained at the metadata server 60 and the clustered servers 45.

Figure 2:
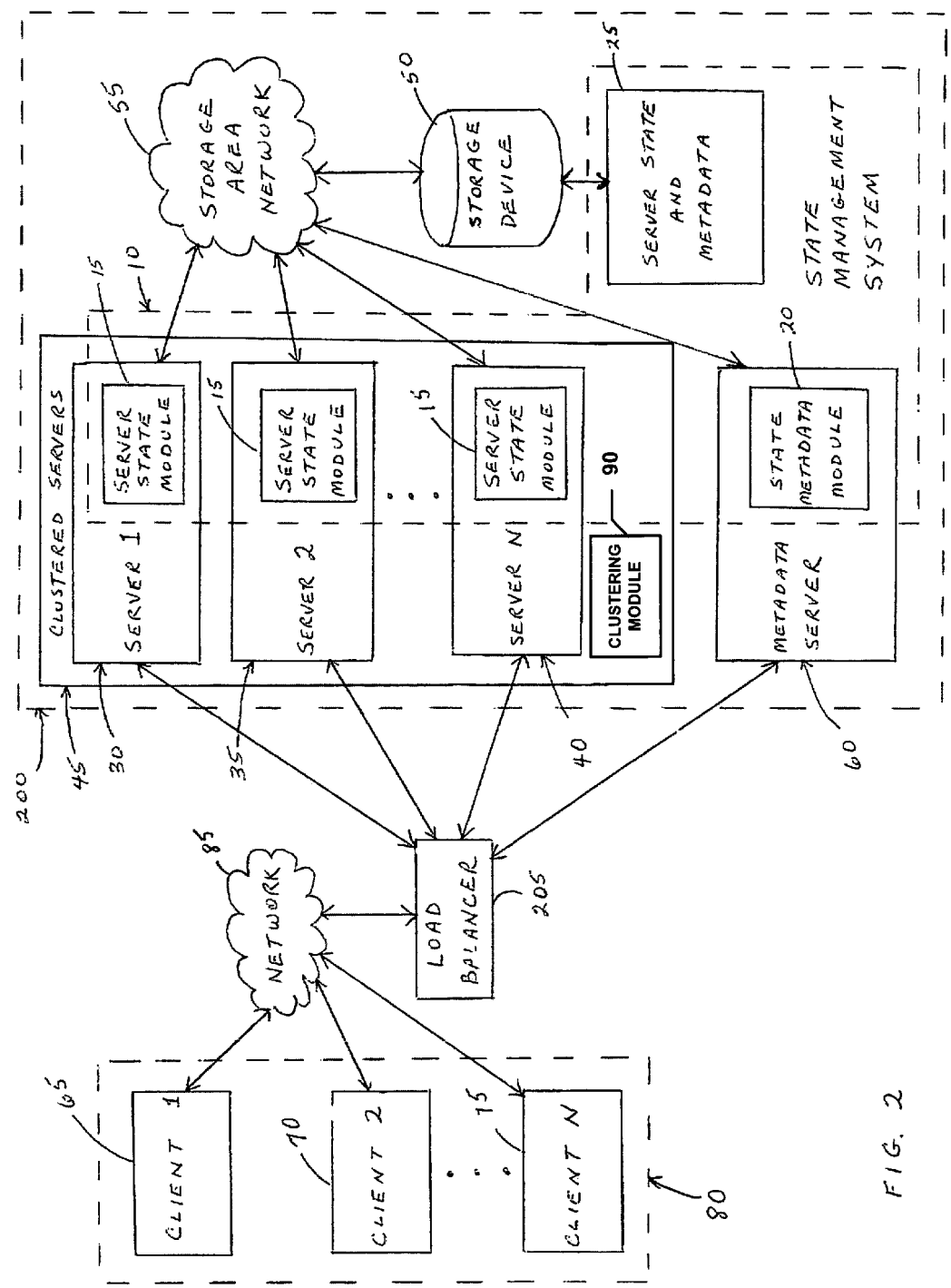
FIG. 2 is a schematic illustration of an exemplary cluster file system using a virtual IP address in which a state management system of the present invention can be used.

FIG. 2 illustrates an exemplary cluster file system 200 utilizing a load balancer 205. The load balancer 205 accepts all requests from clients 80 and routes them to the clustered servers 45, balancing the processing and I/O load among the clustered servers.

The shared storage database 100 assigns a different global IP address to each of the cluster servers 45. The architecture of the shared storage database 100 is a multi-IP address architecture. The clustered servers 45 are hidden behind the load balancer 205 in the cluster file system 200. The load balancer 205 acts as a traffic-switching server that balances the traffic of the cluster file system 200 among the clustered servers 45. The architecture of the cluster file system 200 is a virtual IP architecture. In the cluster file system 200, a single global IP address is exported to clients 80 by the load balancer 205. The shared storage database 100 and the cluster file system 200 are fault tolerant with respect to failures in the clustered servers 45. In the shared storage database 100, fault tolerance is achieved through IP address takeover. In the cluster file system 200, fault tolerance is provided by the load balancer 205 that ceases to distribute traffic to any of the clustered servers 45 that fail during regular operation.

The cluster file system 200 and the shared storage database 100 perform in a similar manner; the shared storage database 100 is referenced hereinafter as representative of the shared storage database 100 and the cluster file system 200.

Lock requests are received through any of the clustered servers 45 and then handed to the clustering module 90. The clustered servers 45 act as servers and also as clients to the shared storage database 100. The metadata server 60 comprises one or more servers. The clustered servers 45 satisfy requests by using data cached by a local cache or by forwarding requests to the metadata server 60. Locks are implemented on top of a file record lock feature provided by the shared storage database 100. The clustered servers 45 maintain ownership of the lock leases (but not the locks themselves).

System 10 supports and enforces file and file record locks even in the presence of server failures in the clustered servers 45 and load balancing redirection events initiated by the load balancer 205. The lock state is generally maintained at the metadata server 60; consequently, load-balancing events are supported almost transparently as no extra messages or lock migration is required.

Figure 3:
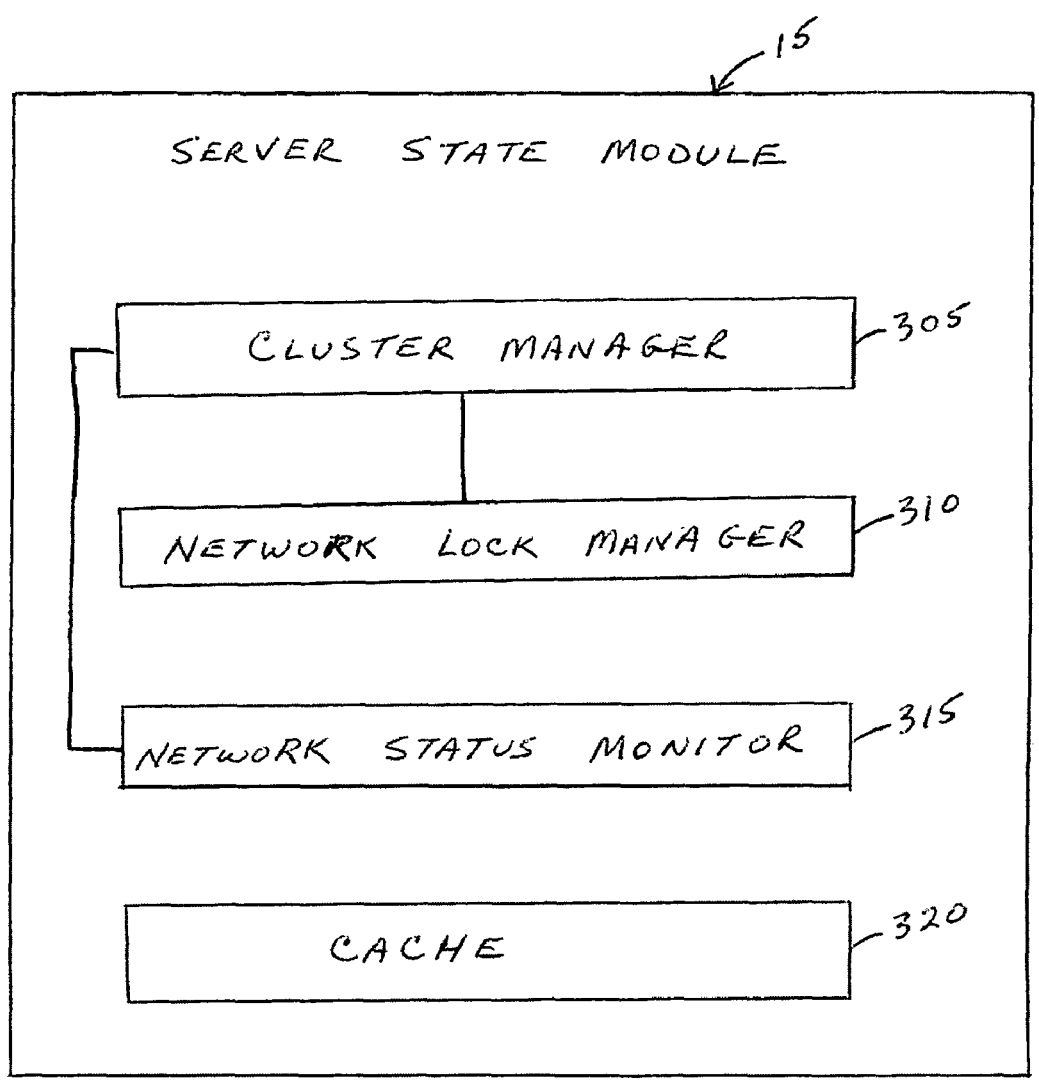
FIG. 3 is a high-level architecture of a server state module of the state management system of FIGS. 1 and 2.
Figure 4:
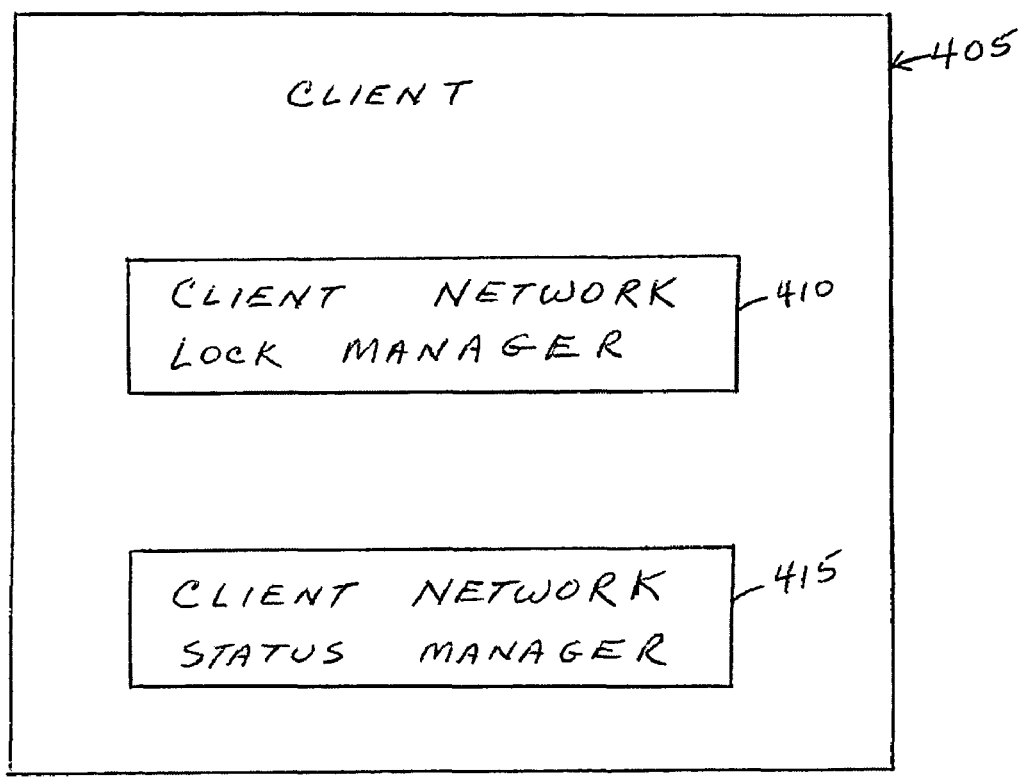
FIG. 4 is a high-level architecture of a client of the cluster file system of FIGS. 1 and 2.

FIG. 3 illustrates a high-level hierarchy of the server state module 15. The server state module 15 comprises a cluster manager 305, a network lock manager 310, a network status manager 315, and a cache 320 for storing state information. FIG. 4 illustrates a high-level hierarchy of a client 405 representative of each of the clients 80. Client 405 comprises a client network lock manager 410 and a client network status manager 415.

Any of clients 80 may interact with any of the clustered servers 45. In the following discussion, the client 1, 65, is used as a generic representative of clients 80 while the server 1, 30, is used as a generic representative of the clustered servers 45. While discussed in terms of a lock, it should be clear that the performance of system 10 is applicable to, for example, any state.

The client 1, 65, issues requests to the server 1, 30. The server 1, 30, accesses data on the storage device 50 and performs I/O operations. The client 1, 65, mounts file systems exported by the server 1, 30, so that the file systems appear as a local file system to the client 1, 65.

The client 1, 65, may lock a file or a file record on any of the clustered servers 45; these locks may be monitored or unmonitored. Monitored locks are fault-tolerant against failures in clients 80 or the clustered servers 45. If the client 1, 65, obtains a lock on the server 1, 30, and the server 1, 30, subsequently fails, the lock can be reinstated by the client 1, 65, when the server 1, 30, recovers from failure. If the client 1, 65, fails while holding a monitored lock on a server 1, 30, the server 1, 30, discards the lock when notified of the failure by the client 1, 65.

For the purposes of illustration, server 2, 35, is designated as the cluster leader (further referenced herein as cluster leader 35). Any of the cluster servers 45 may be selected to perform the role of cluster leader. The cluster leader 35 maintains a persistent state in the shared storage database 100; the persistent state is used through the lock recovery process. The persistent state is created to monitor each of the cluster servers 45 that are holding a lock. The persistent state is placed in a cluster-shared persistent state. The availability of the cluster-shared persistent state enables each of the cluster servers to readily access state information, enabling failover.

After a failure by one of the cluster servers 45, the cluster leader 35 controls the lock recovery process. The cluster leader 35 sets all of the cluster servers 45 to a grace period state and sends notifications to clients 80. The grace period state is in effect for a predetermined window of time, or grace period. The cluster leader 35 further processes lease expiration requests initiated by the metadata server 60. The metadata server 60 monitors a leadership status of the cluster servers 45; consequently, the metadata server 60 can communicate lease expiration events to the cluster leader 35 to enable lock recovery.

When one of the cluster servers 45 fails or reboots, all of the cluster servers 45 are concurrently placed in the grace period. Placing all of the cluster servers 45 in the grace period prevents any of clients 80 from stealing the locks held through a failed or rebooted server. Once all of the cluster servers 45 are placed in the grace period state, the cluster leader 35 sends change of state notifications to each of clients 80 that held locks through the failed or rebooted server. Each of clients 80 can then reclaim their locks. The grace period provides sufficient opportunity to reclaim the locks. A client that holds locks on different files across additional servers may reclaim locks that are still in place. System 10 is designed to manage such a scenario.

System 10 coordinates the clustering module 90 and the server state module 15. More precisely, the clustering module 90 may release a locking state created by one of the clustered servers 45 (e.g., the server 1, 30) if the clustering module 90 believes that the server 1, 30, has failed. Releasing this lock state without notifying clients 80 that hold locks on the server 1, 30, exposes those locks to being acquired by other clients 80. To prevent this scenario, system 10 provides an interface that enables the cluster leader 35 to initiate a grace period/lock reclaim sequence when the clustering module 90 is about to give up locks acquired through a server such as the server 1, 30.

When the clustering module 90 is about to expire the lease that enforces the locks held by one of clients 80, it notifies the server state module 15 so that the server state module 15 can initiate a grace-period/lock-recovery sequence before the clustering module 90 gives up the locks. The server state module 15 initiates the grace period in all of the clustered servers 45 that remain. The server state module 15 then notifies the distributed file system when all of the clustered servers 45 are in the grace period state. At this time, the clustering module 90 is free to expire the lease and release the lock state for the server 1, 30, the server that has failed.

If the server state module 15 fails to notify the clustering module 90 that the grace period has been established, the lease for the failed server in the shared storage database 100 is forced to expire after a longer wait period. Such a situation may occur if the communication between the cluster leader 35 and the shared storage database 100 is disrupted for a prolonged period of time or when all the clustered servers 45 in the shared storage database 100 fail. Consequently, system 10 is resilient to failures in the NAS cluster manager.

The cluster manager 305 is designed to be fault tolerant because the server where the cluster manager 305 is running (i.e., the cluster leader 35) may fail. System 10 makes the cluster manager 305 fault tolerant by saving the state of the cluster manager 305 in a cluster persistent state. If the lock recovery process is interrupted by a failure of the cluster leader 35, the lock recovery process is re-started in any of the remaining clustered servers 45 selected as a new cluster leader. The cluster manager 305 can restart the lock recovery procedure from the beginning without any side effects: locks that have already been reclaimed may be reclaimed again and those that have not been reclaimed can be reclaimed under the rule of the new cluster leader. The new cluster manager establishes a cluster-wide grace period and re-issues all the necessary messages to clients 80.

If the shared storage database 100 issues a lease expiration notification to the cluster manager 305 during periods of failure of the cluster leader 35, the shared storage database 100 accumulates notifications of lease expirations until a new cluster manager registers with the shared storage database 100. When the new cluster manager registers, accumulated lease expiration notifications are forwarded to the new cluster manager. The new cluster manager acknowledges and processes the accumulated lease expiration notifications.

Lock ownership is defined by a state tuple comprising a network address of the client requesting the lock (e.g., the client 1, 65) and a process ID of a process issuing a lock request. This information is readily available in typical lock requests and can be passed to the shared storage database 100. Identifying locks with the state tuple ensures that conflicting lock requests passed to the shared storage database 100 through the clustered servers 45 are detected and only a single lock request is granted at any time. Further, conflicting lock requests received through different protocols can be detected by the shared storage database 100. Lock requests generated by local access to the file system exported by the clustered servers 45 can also be enforced against network-file-system-protocol-originated locks at the level of the underlying file system.

Single server lock acquisition and recovery performs as follows, wherein the client 1, 65, represents any one of clients 80 and the server 1, 30, represents any one of the clustered servers 45. When the client 1, 65, acquires a lock through the server 1, 30, the network status monitor 215 at the server 1, 30, starts monitoring changes of status at the client 1, 65, while the client network status manager 315 at the client 1, 65, starts monitoring changes of status at the server 1, 30. Changes of status in this context represent reboots or restarts of the process of the network status monitor 315 or the client network status monitor 415.

In existing single-server configuration, lock recovery works as described next. If the server 1, 30, reboots or restarts the process of the network status monitor 215 on the server 1, 30, the state of the lock acquired by any of clients 80 through the server 1, 30, is lost. For proper operation, system 10 relies on each of the clients 80 reclaiming locks during the grace period after, for example, the server 1, 30, reboots or restarts.

When the server 1, 30, is restarted, the network status monitor 315 on the server 1, 30, checks the persistent database of clients 80 that are monitored and notifies those clients 80 about the reboot or restart of the server 1, 30. At that time, the server 1, 30, enters the grace period in which all new lock requests are rejected or delayed; only reclaim lock requests are honored during the grace period. Clients 80 that are holding locks at the reboot server are notified through the protocol of the network status monitor 315 and urged to reclaim their previous locks during the grace period of the server 1, 30, before any of the other clients 80 are given an opportunity to appropriate locks previously held by the server 1, 30. The lock recovery procedure just described does not directly extend to the architectures of the clustered servers 45; consequently, system 10 describes a lock recovery scheme that can be used in environments such as the clustered file system 100.

System 10 maintains a copy of the lock state for each of the clustered servers 45 in cache 320 of the server that is holding the lock. For example, a copy of the lock state for all the locks held by the server 1, 30, is held in the cache 320 of the server 1, 30. Furthermore, system 10 maintains a copy of the states in the server state and metadata module 25. Maintaining a copy of the states in the server state and metadata module 25 improves performance when additional lock requests are routed through the same server in the clustered servers 45. For example, a record of a lock that has been granted is kept in one of the clustered servers 45 such as, for example, the server 1, 30. Subsequent, conflicting lock requests routed through the server 1, 30, may be blocked or refused without being passed to the shared storage database 100 and potentially generating extra network messages in the storage area network 50.

When a lock request arrives at the exemplary server 1, 30, the cache 320 of the server 1, 30, is checked for conflicting locks. If such check fails to produce a conflicting lock, the lock request is then handed to the shared storage database 100 where the lock is granted or rejected based on whether the state is present at the server state and metadata module 25. The server 1, 30, caches granted locks. Lock state maintained in clustered servers 45 is volatile and can be reconstructed in any of the other clustered servers 45 using the state maintained in the server state and metadata 25.

When using the load balancer 205 in the cluster file system 200, lock caching at the clustered servers 45 is disabled to prevent state consistency issues.

System 10 comprises the cluster manager 305 that controls the network lock manager 310 and the network status monitor. System 10 comprises a level of support from the shared storage database 100 such that lease expiration events in the shared storage database 100 can be communicated to the cluster manager 305. The shared storage database 100 supports file locks whose enforcement is based on client-based leases: clustered servers 45 obtain and renew leases that enforce locks acquired on various files. The shared storage database 100 has an interface to notify external users of lease expiration events and synchronize the lease expiration events with external software.

When one of the clustered servers 45 such as, for example, the server 1, 30, fails while holding a lock on behalf of one of clients 80 such as the client 1, 65, the client 1, 65 is notified of the failure of the server 1, 30. Upon receiving this notification, the client 1, 65, proceeds to reclaim locks acquired through server 1, 30. Notifications of failure by one of the clustered servers 45 (further referenced herein as a lease expiration notification) may be originated by the shared storage database 100 or by system 10.

The shared storage database 100 notifies the cluster leader 35 about a lease expiration event of one of servers 45 via a notification interface of system 10. The shared storage database 100 requests the removal of the failed server (the server 1, 30) from membership in the clustered servers 45 and waits until the removal has been completed. The shared storage database 100 sets the network lock manager 310 in each of the clustered servers 45 that remain to the grace period state to prevent any new lock requests from reaching the failed server (the server 1, 30). The shared storage database 100 issues a lease expiration notification acknowledgment to the cluster leader 35 so that the lock state for the server whose lease has expired (the server 1, 30) can be released. The shared storage database 100 notifies each of clients 80 through the network status monitor 315 on each of clients 80 that locks held through the failed server (i.e., the server 1, 30) are required to be reclaimed.

Each of clients 80 whose lock state in the server 1, 30, has been lost attempt to reclaim locks through any of the servers 45 that remain. The reclaim requests of the network lock manager 310 are mapped to reclaim requests of the shared storage database 100. The network lock manager 310 performs this mapping. Locks being reclaimed are most likely available and are granted to each of the clients 80 requesting the lock. These locks may be in the unlocked state or in the lease-expired state where reclaims can be accepted. The network lock manager 310 on each of the cluster servers 45 is in the grace period state as the reclaims occur; consequently, locks that can be reclaimed are not granted to any of clients 80 requesting those locks with non-reclaim lock operations.

However, after the cluster system has acknowledged a lease expiration notification and before clients 80 reclaim previously held locks, the locks become available for other file access protocols or local cluster file system requests. Consequently, a lock may be lost to another file access protocol during the grace period for one file access protocol. If any of clients 80 affected by the failure of the server 1, 30, held locks through additional servers in the clustered servers 45, the clients 80, may end up reclaiming locks that are still active. In this case, the reclaim may or may not be routed through the server 1, 30, that currently holds the lock. In either case, each of the cluster servers 45 accept reclaims based on ownership of the lock by any of clients 80. In this scenario, the shared storage database 100 updates ownership of the lease on the locks.

If a failure of any of the clustered servers 45 is originally detected by the cluster system, processing of the locks is similar to the process of detecting failures through the lease expiration notifications previously described. When the cluster manager 305 on the cluster leader 35 detects a server failure, the cluster manager 305 ejects the failed server from the cluster membership. The cluster manager 305 sets the network lock manager 310 on each of the clustered servers 45 to the grace period state. The cluster manager 305 issues a notification to the network status monitor 315 of clients 80 that held locks through the failed server.

System 10 may issue a "lease expired" message to the cluster manager 305 while the steps described above are in progress; in this case this message may be acknowledged and otherwise ignored. If the lease expiration notification arrives when another instance of the server has been accepted to the clustered servers 45, the server may be dropped and reintroduced at a later time without significant side effects other than delays in the reintegration of the server to the clustered servers 45.

If the lease expiration message arrives once the server has been dropped from the clustered servers 45, the message is acknowledged and otherwise ignored. When the recovery is initiated by the cluster system, it is possible that reclaims arrive for locks that are being leased by the server that was just dropped. It may take some time for the shared storage database 100 to detect a server drop event. In this scenario, the reclaim request is routed through one of the other clustered servers 45; the metadata server 60 honors the lock request by swapping the lease ownership of the lock to the server that received the reclaim.

When access to a file is migrated from one of the clustered servers 45 to another of the clustered servers 45 for load balancing purposes, no special action is necessary by system 10. Lock requests are percolated to the cluster file system 10 with the state tuple (process ID, client ID) passed by a client such as the client 1, 65. As a requirement, all lock requests may be honored by the shared storage database 100 no matter which of the clients 80 originates the lock request provided that a lock range involved is free or the owner of the lock matches any preexisting owner. This enables system 10 to acquire locks on behalf of any of clients 80 through one of the cluster servers 45 and later release the lock through a different one of the clustered servers 45 when access to the underlying file is migrated. Lock state does not need to be migrated along with access to a file; consequently locks are not exposed to being lost during file migration.

The cluster manager 305 drives lock recovery by invoking programs that handle the various phases of lock recovery. When a server leaves the clustered servers 45 (Server Remove), the cluster manager 305 drives the lock recovery through recovery phases that are separated by barrier synchronization between all of the clustered servers 45. In an initial phase of recovery, the cluster manager 305 sets the network status monitor 315 for each of the clustered servers 45 to a grace-period state. The cluster manager 305 issues acknowledgments (via an acknowledgement protocol) for all outstanding lease expiration notifications issued related to the server that is leaving the clustered servers 45, and sends notification messages to all affected clients. Only the cluster manager 305 of the cluster leader 35 makes this call.

The cluster manager 305 of the cluster leader 35 monitors in persistent state the servers that are being removed from the clustered servers 45 so it can send a notification for each of the removed servers once all the remaining servers in the clustered servers are in the grace period state. In a next phase of the recovery, the cluster manager 305 further notifies all clients 80 affected by the removal of servers from the clustered servers 45 via a status monitor protocol. Only the cluster manager 305 on the cluster leader 35 performs this action. Such notification is issued for every server removed from the clustered servers 45.

Any additions of servers to the clustered servers 45 are delayed until the lock recovery phases described above are completed. Server removals, including removal of the cluster leader 35, are dealt with during the recovery process phases described above. If system 10 is setting the grace period and another server is removed from the clustered servers 45, system 10 sets the grace period in all remaining servers once again. If a server is removed from the clustered servers 45 after the grace period is set, system 10 restarts recovery from the initial phase but sends notification only for the server just removed.

The network status monitor 315 tracks each of clients 80 that hold locks through the specific server in the clustered servers 45 that owns the lease of the lock. This state is kept because clients 80 may need to reassert their locks upon failure of one of the clustered servers 45. To enable lock recovery, this state may be preserved across reboot and failures of a server. To ensure such state is preserved across failure events, the state is stored in the server state and metadata module 25.

The network status monitor 315 on each of the clustered servers 45 maintains a list of clients 80 that own locks on their respective server in different directories of the shared storage database 100. As an example, the shared storage database 100 comprises two servers, a server N0 and a server N1, each with a network status monitor 315. A state of the network status monitor 315 for each of the two servers is stored in the shared file system in different paths: /Shared_FS/N0/statd and /Shared_FS/N1/statd. If server N0 fails, system 10 notifies clients 80 that held locks acquired through server N0 as recorded in the /Shared_FS/N0/statd/directory. System 10 further removes the state corresponding to the failed server, server N0, from a directory of the shared storage database 100. The cluster manager 305 of the cluster leader 35 is in charge of generating the notification messages sent to clients 80.

A mount protocol for the clustered file system 100 relies on information that is made persistent through all the clustered servers 45 for proper operation of clustered implementations. An initial piece of information that is shared by all the clustered servers 45 is the export list; i.e., which directories are available to clients 80 and related permissions for those directories. The mount protocol verifies each mount request against an export list defined for the clustered servers 45. The export list is distributed to each of the clustered servers 45 because the routing of the mount requests is not known in advance. Given the above requirements, the export list can be kept in the shared storage database 100 where it is available to all of the clustered servers 45 concurrently and where the export list can be consistently modified using a configuration utility.

The mount protocol comprises a mount list maintained in a persistent state to monitor which file systems are mounted by each of clients 80. The mount list is maintained in the server state and metadata module 25 and on each of the clustered servers 45. System 10 uses the mount list when recovering from a failure by one of the clustered servers 45. After one of the clustered servers 45 crashes and reboots, the mount list enables the failed server to remember file systems mounted by each of clients 80 previously. Consequently, each of clients 80 is provided uninterrupted access to their respective file systems without requiring each of clients 80 to remount their respective file system.

The information in the mount list is further shared with the shared storage database 100. The shared storage database 100 keeps a memory image of the mount list to restrict client access to those file systems that have been successfully mounted with the correct permissions. System 10 further manages a situation where one of the clustered servers 45 receives the mount request and another of the clustered servers 45 receives file operations on the mounted file system. Furthermore, when one of clients 80 issues a mount request, any of the clustered servers 45 is able to process the request regardless of which of the clustered servers 45 received the request.

One or more of the clustered servers 45 may update the mount list at a given time. Consequently, the mount list is locked when access to a mount state file is required. The shared storage database 100 maintains a memory copy in cache 320 of the mount list to check for client permission to access various file systems. System 10 requires each of the clustered servers 45 to update their cache copy of their mount state with every modification that occurs at any of the clustered servers 45. In one embodiment, a shared file comprising the mount list is read by the cluster system after each update to the mount list. In another embodiment, the clustered servers 45 memory maps the file comprising the mount list so that updates to the mount list are reflected into memory. In a further embodiment, the cluster system can read the shared file comprising the mount list each time the cluster system fails to verify client permissions with the information held in memory.

System 10 comprises support for asynchronous writes in which clients 80 can write data to the clustered servers 45 without requiring the clustered servers 45 to commit data to stable storage before replying to the write request. Once one of clients 80 (i.e., the client 1, 65) completes the asynchronous write operations, it issues a commit request to direct the server (i.e., the server 1, 30) to flush data to stable storage. Upon receiving a write or commit request, the server 1, 30, provides the client 1, 65, with a number, called the verifier, which the client 1, 65, may present to the server 1, 30, upon subsequent write or commit operations. The verifier is a cookie, included in write and commit responses sent to the client 1, 65, that the client 1, 65, can use to determine if the server 1, 30, has changed state (i.e., failed) between a call to write and a subsequent call to write or commit.

There are scenarios in which a client such as the client 1, 65, may be misguided into believing that an asynchronous write was actually committed to persistent store, even when the asynchronous write may have not have been flushed to persistent storage. For example, consider the scenario where the client 1, 65, sends an asynchronous write to one of the clustered servers 45 such as the server 1, 30. The server 1, 30, fails before committing the write to persistent store. Now consider that the client 1, 65, is failed over to another of the clustered servers 45 that happens to have the same verifier as the failed server, the server 1, 30. In this situation, the client 1, 65, may issue a commit to the new server and receive a successful response even when the data written to the server 1, 30, was actually lost.

System 10 prevents this scenario by ensuring that each of the clustered servers 45 use different write verifiers at all times. This requirement is coordinated via cluster system when each of the clustered servers boots up. In one embodiment, the start time of each of the clustered servers 45 is used as the verifier. Clocks among the clustered servers 45 are kept synchronized and are always started sequentially to ensure that all of the clustered servers 45 maintain a different verifier at all times.

System 10 requires each of the clustered servers 45 to enter the grace period during failover and fail-back operations, potentially preventing all new lock operations during that period. However, the server state and metadata module 25 on the storage device 50 keeps track of the servers in the clustered servers 45 that have failed or are in the process of failing back. Further, the server state and metadata module 25 monitors the locks acquired through that failed server. Consequently, the server state and metadata module 25 could implement selective responses indicating whether a set of locks is in the grace period or not; furthermore, lock requests that occur during the grace period but that do not refer to locks that are going through grace period could be granted.

In one embodiment, system 10 comprises a selective grace period in which locks that have no relationship to servers in transition states are available if they are not locked. For example, a file lock, lock L1, is held through the server 1, 30, and the server 1, 30 fails. The server state and metadata module 25 has a record of the fact that the server 1, 30, is holding lock L1. Any lock request coming in for a lock that does not conflict with lock L1 receives a normal response from the server state and metadata module. If the requested lock conflicts with any outstanding lock, the requested lock is rejected. If the lock does not conflict with any outstanding lock, the requested lock is accepted. If the incoming lock conflicts with lock L1, the server state and metadata module 25 responds with a message that access to lock L1 is in a grace period. In this manner, system 10 avoids the need to place all of the clustered servers 45 in a grace period during failover and fail-back events with respect to all locks.

System 10 supports exporting single or additional network addresses to the clients 85. Consequently, subtle differences exist regarding the type of the notification sent by the network status monitor 315 to clients 80 during server failure or reboot in each scenario. If a single IP address is exported to clients 80 (as in cluster file system 200), the notifications issued by the network status monitor 315 comprise the single IP address. If more than one network address is exported to clients 80, the clustered servers 45 issue the notifications of network status monitor 315 to clients 80 with the network address of the failing server. In the multi-IP address architecture of shared storage database 100, a server may have been serving additional network addresses (of other previously failed servers) and it may need to send the notifications of the network status monitor 315 to clients 80 using those server addresses as well. Sending these extra notifications ensures that system 10 works even when a server network address is repeatedly taken over by remaining servers in the clustered servers 45 until no additional servers remain in the clustered servers 45.

Figure 5A:
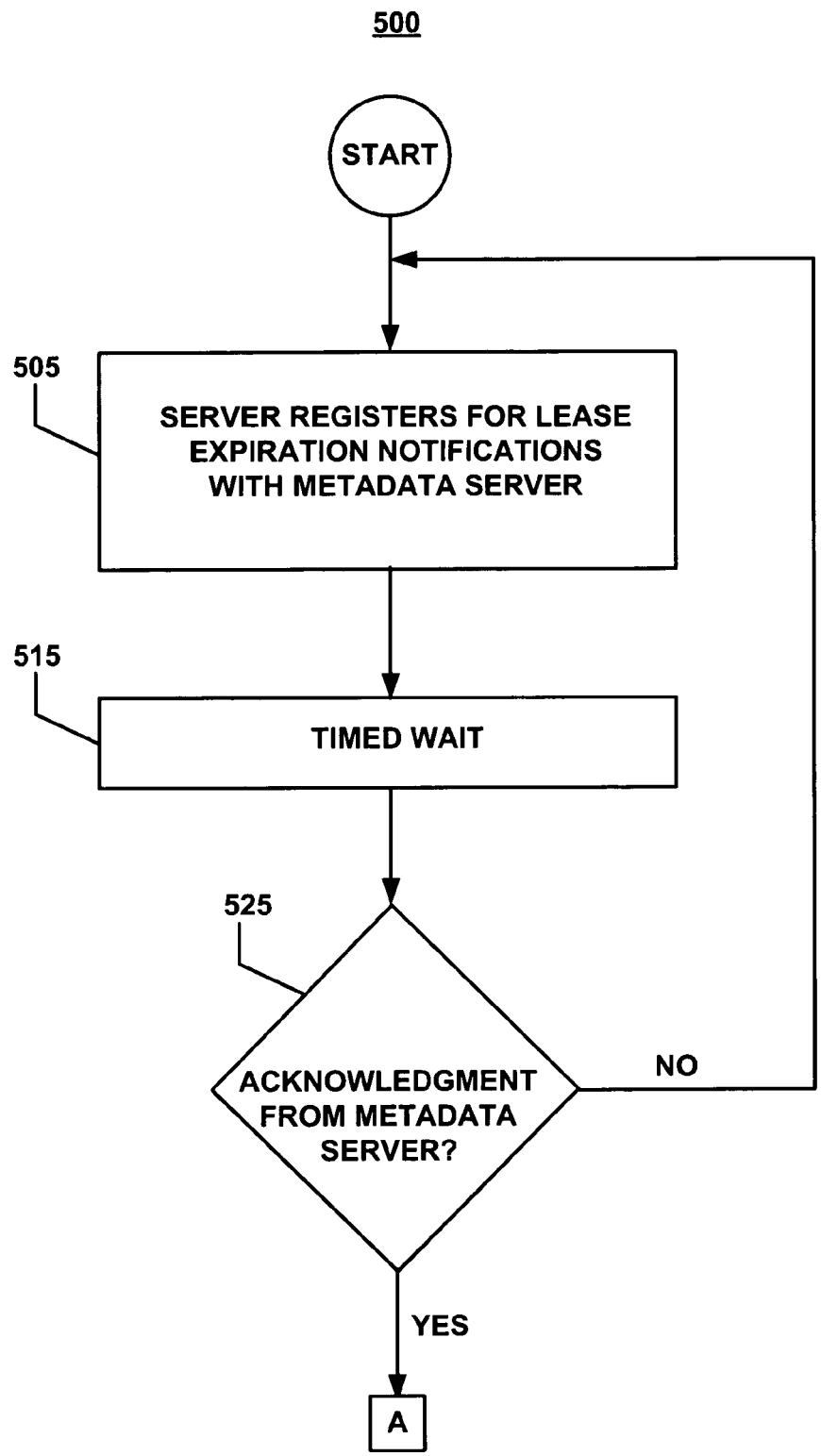
FIG. 5 comprises FIGS. 5A and 5B and represents a method of operation of the state management system of FIGS. 1 and 2.
Figure 5B:
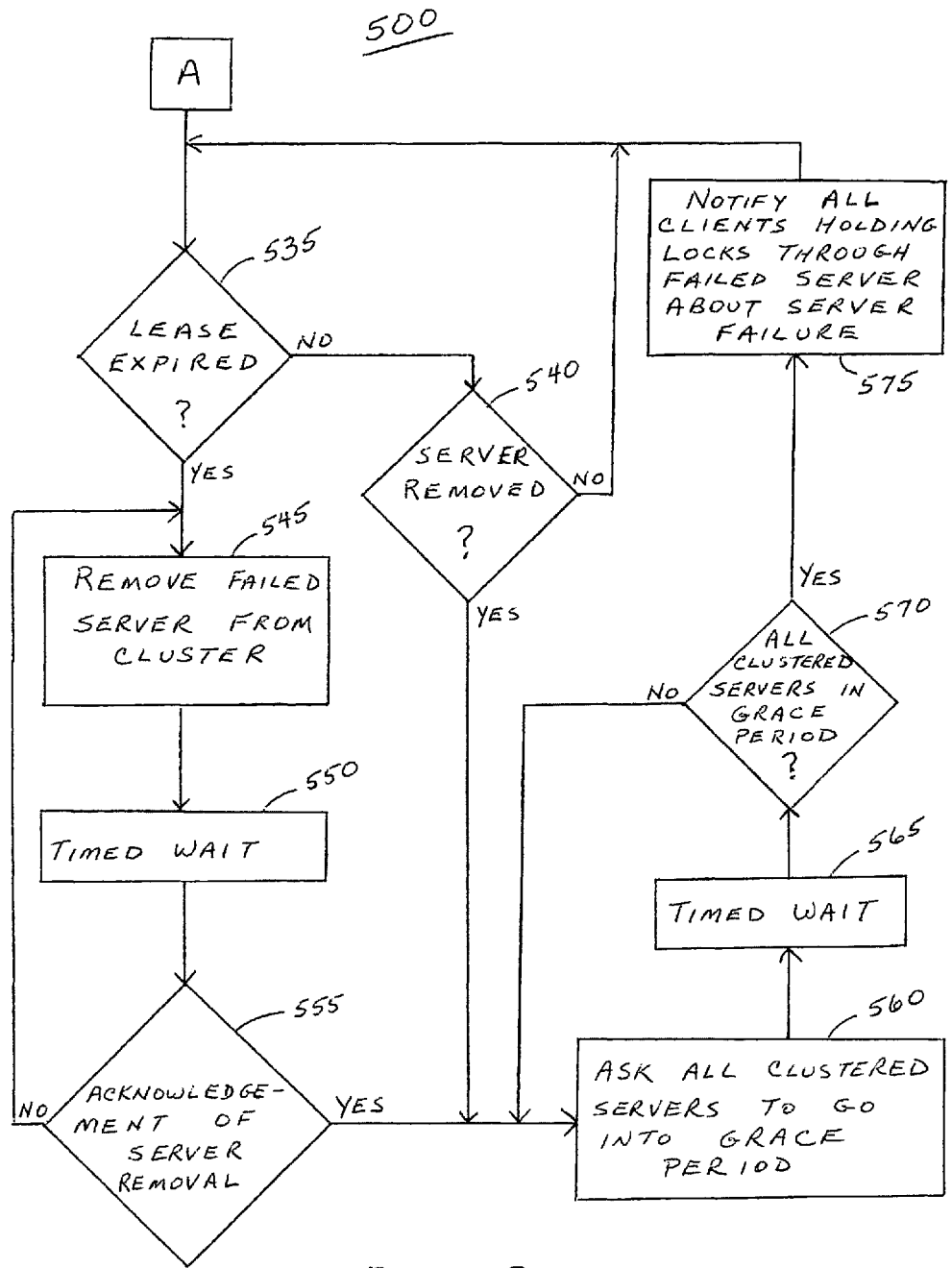

FIG. 5 (FIGS. 5A, 5B) represents a method (500) of system 10. A server (one of the clustered servers 45) registers for lease expiration notifications with a metadata server 60 (step 505) The registration process for the server experiences a timed wait (step 525). If an acknowledgement is not received from the metadata server 60 (decision step 525), the server returns to step 505. Otherwise, system 10 determines whether a lease for a lock has expired (decision step 535).

If a lease has not expired, system 10 determines whether a server has been removed (decision step 540). If not, system returns to step 535. If the lease has expired (decision step 535), system 10 removes the failed server from the clustered servers 45 (step 545). The clustered servers 45 are placed in a timed wait (step 550). If system 10 does not receive an acknowledgement of the server removal (decision step 555), system 10 returns to step 545.

If the server has been removed (decision step 555), system 10 asks all of the clustered servers 45 to go into a grace period (step 560). Likewise, if the server is found to be removed in decision step 540, system 10 asks all the clustered servers 45 to go into a grace period (step 560).

System enforces a timed wait corresponding to the grace period (step 565). System 10 determines whether all the clustered servers 45 are in the grace period (decision step 570). If not, processing returns to step 560 until all the clustered servers 45 are in the grace period. System 10 notifies all the clients 80 that are holding locks through the failed server about the server failure (step 575). Processing then returns to step 535.

It is to be understood that the specific embodiments of the invention that have been described are merely illustrative of certain applications of the principle of the present invention. Numerous modifications may be made to the system and method for preserving state for a cluster of file servers in a cluster file system, in the presence of load-balancing, failover, and fail-back events described herein without departing from the spirit and scope of the present invention. Moreover, while the present invention is described for illustration purpose only in relation to network addresses storage, it should be clear that the invention is applicable as well to, for example, any network file sharing protocol. Furthermore, while the present invention is described for illustration purpose only in relation to a lock, it should be clear that the invention is applicable as well to, for example, any state.

What is claimed is:

1. A method for preserving an operating state for a cluster of data servers with a shared storage, the method comprising:
    interacting, by a data server, with at least one client in a plurality of clients via a communication channel, to generate state information, wherein the state information comprises at least one of an open state associated with a set of files currently open on at least one cluster server in a plurality of cluster servers and a delegation state indicating a set of leases associated with the at least one client, wherein the at least one client uses the set of leases to manage a set of files;
    recognizing an event that causes a data server to fail, wherein the data server is a cluster server in the plurality of cluster servers communicatively coupled to a shared storage database, and wherein each client in the plurality of clients owns at least one lock associated with data in the shared storage database through at least one of the cluster servers in the plurality of cluster servers;
    establishing, after recognizing that the data server has failed, at least one of the data servers as a replacement server for the failed data server;
    placing, in response to the data server failing, each of a remaining set of the cluster servers in a state that prevents each of the plurality of clients from obtaining a lock owned by another of the plurality of clients prior to the data server failing;
    notifying a set of client in the plurality of clients that the data server has failed, wherein each client in the set of clients each own the at least one lock through the data server that has failed;
    granting, in response to placing each of the remaining cluster servers in the state and the notifying, each of the set of clients to reclaim, through at least two of cluster servers, the at least one lock held by the each of the plurality of clients during when each of the cluster servers are in the state;
    initiating a recovery of the failed data server;
    providing, after the data server has failed and after the replacement server has been established, the replacement server with an identity of the failed data server and of clients that were in communication with the failed data server prior to failure;
    providing the replacement server with the state information associated with the clients when the data server failure occurred;
    redirecting the clients to the replacement server;
    the replacement server preserving the provided state information associated with the redirected clients; and
    the replacement server serving the redirected clients.

2. The method of claim 1, further comprising upon recovery of the failed server, performing failback of the clients to the recovered server.

3. The method of claim 1, further comprising load balancing a plurality of clients across available data servers while maintaining a consistent state as indicated by the state information.

4. The method of claim 1, wherein the state information further comprises any one of a file lock or a record lock.

5. The method of claim 2, further comprising enforcing a plurality of requests for locks across any one or more of an initiated data server failover, server failback, and load balancing, and redirecting the clients to the recovered server.

6. The method of claim 4, further comprising providing a selective grace period during the recovery of the failed server, wherein additional requests for locks that do not conflict with failed nodes locks, for files are serviced.

7. The method of claim 1, wherein the clients transparently interact with a plurality of servers other than the failed server.

8. The method of claim 1, wherein recognizing the event that caused the data server to fail, comprises recognizing additional successive failures of additional data servers that are managed by the shared storage data.

9. The method of claim 1, further comprising notifying the clients associated with the failed server of the recognized event.

10. The method of claim 1, wherein the shared storage data is a distributed file system.

11. The method of claim 2, wherein the client and the data servers concurrently use a plurality of protocols for communication; and wherein a shared state is kept consistent and enforced.

12. The method of claim 2, wherein a client registration state with the servers is maintained through failover and failback events.

13. The method of claim 2, wherein multiple concurrent failures of the servers are tolerated if at least one server remains operational.

14. The method of claim 3, where the clients and the server engage in asynchronous operations on the state and keep the state consistent during server failures.

15. A computer program product including a plurality of executable instruction codes on a computer readable medium, for preserving an operating state for a cluster of data servers with a shared storage, the computer program product comprising:
- a first set of instruction codes for interacting with at least one client in a plurality of clients via a communication channel, to generate state information, wherein the state information comprises at least a delegation state indicating a set of leases associated with the at least one client, wherein the at least one client uses the set of leases to manage a set of files;
- a second set of instruction codes for recognizing an event that causes a data server to fail, wherein the data server is a cluster server in the plurality of cluster servers communicatively coupled to a shared storage database, and wherein each client in the plurality of clients owns at least one lock associated with data in the shared storage database through at least one of the cluster servers in the plurality of cluster servers;
- a third set of instruction codes for establishing, after recognizing that the data server has failed, at least one of the data servers as a replacement server for the failed data server;
- a fourth set of instructions codes for placing, in response to the data server failing, each of the remaining cluster servers in a state that prevents each of the plurality of clients from obtaining a lock owned by another of the plurality of clients prior to the data server failing; and notifying a set of client in the plurality of clients that the data server has failed, wherein each client in the set of clients each own the at least one lock through the data server that has failed;
- a fifth set of instruction codes for granting, in response to placing each of the remaining cluster servers in the state and the notifying, each of the set of clients to reclaim, through at least two of cluster servers, the at least one lock held by the each of the plurality of clients during when each of the cluster servers are in the state;
- a sixth set of instruction codes for initiating a recovery of the failed data server;
- a seventh set of instruction codes for providing, after the data server has failed and after the replacement server has been established, the replacement server with an identity of the failed data server and of clients in were communication with the failed data server prior to failure;
- an eighth set of instruction codes for providing the replacement server with the state information associated with the clients when the data server failure occurred;
- a ninth set of instruction codes for redirecting the clients to the replacement server;
- wherein the replacement server preserves the provided state information associated with the redirected clients; and
- wherein the replacement server serving the redirected clients.

16. The computer program product of claim 15, further comprising upon recovery of the failed server, a tenth set of instruction code performs failback of the clients to the recovered server.

17. The computer program product of claim 15, further comprising an eleventh set of instruction codes for load balancing a plurality of clients across available data servers while maintaining a consistent state as indicated by the state information.

18. A system for preserving a state for an operating cluster of data servers with a shared storage, the system comprising:
- a data server for interacting with at least one client in a plurality of clients via a communication channel, to generate state information, wherein the state information comprises at least one of an open state associated with a set of files currently open on at least one cluster server in a plurality of cluster servers and a delegation state indicating a set of leases associated with the at least one client, wherein the at least one client uses the set of leases to manage a set of files;
- a clustering module for recognizing an event that causes a data server to fail, wherein the data server is a cluster server in the plurality of cluster servers communicatively coupled to a shared storage database, and wherein each client in the plurality of clients owns at least one lock associated with data in the shared storage database through at least one of the cluster servers in the plurality of cluster servers;
- the clustering module establishing, after recognizing that the data server has failed, at least one of the data servers as a replacement server for the failed data server;
- a cluster leader placing, in response to the data server failing, each of the remaining cluster servers in a state that prevents each of the plurality of clients from obtaining a lock owned by another of the plurality of clients prior to the data server failing;
- the cluster leader notifying a set of client in the plurality of clients that the data server has failed, wherein each client in the set of clients each own the at least one lock through the data server that has failed
- the cluster leader granting, in response to placing each of the remaining cluster servers in the state and the notifying, each of the set of clients to reclaim, through at least two of cluster servers, the at least one lock held by the each of the plurality of clients during when each of the cluster servers are in the state;
- the cluster leader initiating a recovery of the failed data server;
- the cluster leader providing, after the data server has failed and after the replacement server has been established, the replacement server with an identity of the failed data server and of clients were in communication with the failed data server prior to failure;

the cluster leader further providing the replacement server with the state information associated with the clients when the data server failure occurred;
the cluster leader redirecting the clients to the replacement server;
the replacement server preserving the provided state information associated with the redirected clients; and
the replacement server serving the redirected clients.

19. The system of claim 18, further comprising upon recovery of the failed server, the cluster leader performing failback of the clients to the recovered server.

20. The system of claim 18, wherein the state information further comprises any one of a file lock or a record lock.

* * * * *